United States Patent [19]
Tokunaga

[11] Patent Number: 5,195,179
[45] Date of Patent: Mar. 16, 1993

[54] COORDINATE INPUT APPARATUS

[75] Inventor: Hiroshi Tokunaga, Norashino, Japan

[73] Assignees: Hitachi, Ltd., Tokyo; Hitachi Keiyo Engineering Co., Ltd., Narashino, both of Japan

[21] Appl. No.: 526,533

[22] Filed: May 21, 1990

Related U.S. Application Data

[63] Continuation of Ser. No. 8,336, Jan. 29, 1987, abandoned.

[30] Foreign Application Priority Data

Jan. 29, 1986 [JP] Japan .................................. 61-15723

[51] Int. Cl.$^5$ ........................................... G06F 15/40
[52] U.S. Cl. .................................... 395/161; 395/155; 340/706
[58] Field of Search ................ 364/518, 521; 340/706, 340/709, 710; 395/155, 161

[56] References Cited

U.S. PATENT DOCUMENTS

| | | | |
|---|---|---|---|
| 4,500,876 | 2/1985 | English et al. | 340/710 |
| 4,514,726 | 11/1985 | Whetstone et al. | 340/710 |
| 4,563,740 | 1/1986 | Blake et al. | 364/414 |
| 4,564,835 | 1/1986 | Dhawan | 340/710 |
| 4,578,674 | 3/1986 | Baker et al. | 340/710 |
| 4,682,159 | 7/1987 | Davison | 340/709 |
| 4,691,199 | 9/1987 | Shell | 340/710 |
| 4,698,626 | 10/1987 | Sato et al. | 340/710 |
| 4,734,685 | 3/1988 | Watanabe | 340/710 |

FOREIGN PATENT DOCUMENTS

| | | |
|---|---|---|
| 3427658 | 2/1985 | Fed. Rep. of Germany ...... 340/710 |
| 0029941 | of 1982 | Japan . |
| 0129643 | of 1983 | Japan . |
| 0149535 | 2/1983 | Japan . |
| 0022126 | of 1984 | Japan . |
| 0090433 | of 1984 | Japan . |
| 0111524 | of 1984 | Japan . |
| 0170930 | 9/1984 | Japan .................................. 340/710 |

OTHER PUBLICATIONS

Karnaugh "Cursor Positioning Device" *IBM Tech. Disclosure Bulletin* vol. 22 No. 7 Dec. 1979.
Depraz "Interactive Graphic Input Device" *Swiss Federal Inst. of Tech.* Mouse P-4 Feb. 1982.

*Primary Examiner*—Gary V. Harkcom
*Assistant Examiner*—Phu K. Nguyen
*Attorney, Agent, or Firm*—Antonelli, Terry, Stout & Kraus

[57] ABSTRACT

A coordinate input apparatus responsive to physical movement of an operation section for moving and displaying a cursor displayed on a display screen at a corresponding coordinate position on the display screen has a unit for deciding a ratio of cursor movement which detects the operation speed of the operation section and decides the ratio of cursor movement on the display screen for a predetermined amount of the movement of the operation section based on the operation speed. A display unit moves and displays the cursor on the display screen corresponding to the amount of movement of the operation section based on the ratio of cursor movement thus decided. As a result, even if the amount of movement of the oper..tion section is constant, when the operation section is moved at a high speed, the cursor moves a long distance; whereas, when the operation section is moved at a low speed, the cursor moves a short distance.

34 Claims, 9 Drawing Sheets

FIG. 1
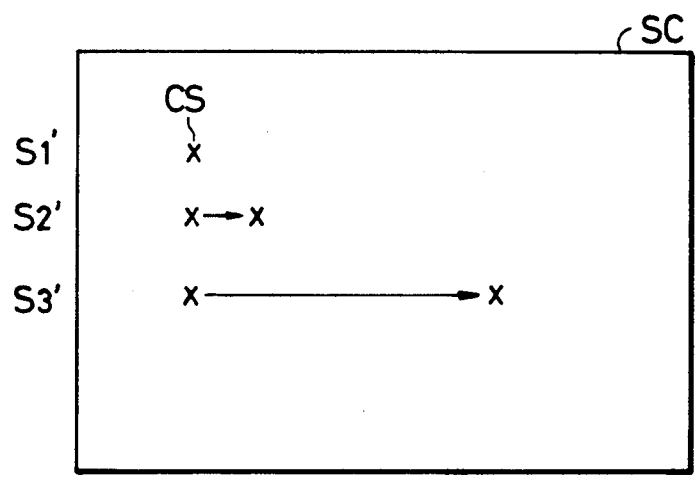
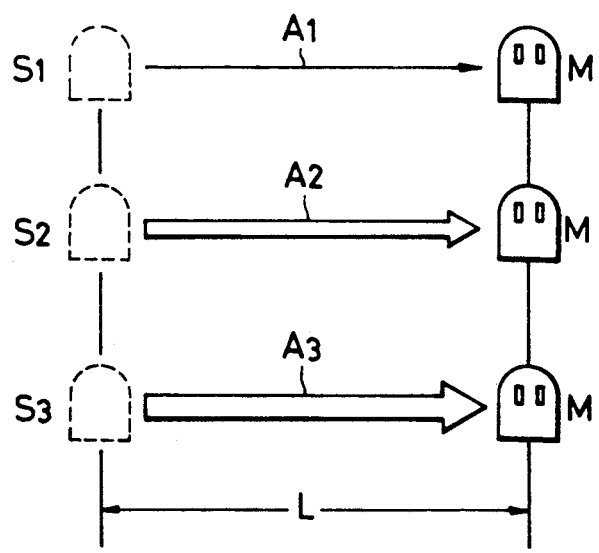

FIG. 13

| RANGE | AMOUNT OF MOVEMENT | SPEED (COUNT/sec.) | AREA OF FIG. 7 | INCREASING DODS | DOT INTEGRATION VALUE |
|---|---|---|---|---|---|
| $v_1$ | 4 | 40 | A | $K_0 \times 4 = 0$ | 0 |
| $v_2$ | 9 | 90 | C | $K_2 \times 9 = 9$ | 9 |
| $v_3$ | 8 | 80 | C | $K_2 \times 8 = 8$ | 17 |
| $v_4$ | 1 | 10 | A | $K_0 \times 1 = 0$ | 17 |
| $v_5$ | 1 | 10 | A | $K_0 \times 1 = 0$ | 17 |
| $v_6$ | 3 | 30 | A | $K_0 \times 3 = 0$ | 17 |
| $v_7$ | 5 | 50 | B | $K_1 \times 5 = 2$ | 19 |
| $v_8$ | 5 | 50 | B | $K_1 \times 5 = 2$ | 21 |
| $v_9$ | 21 | 210 | D | $K_3 \times 21 = 47$ | 47 |

FIG. 14

| EXAMPLE | COMBINATION | SUM OF MOUS MOVEMENT (COUNTED VALUE) | AMOUNT OF CURSOR MOVEMENT (DODS) |
|---|---|---|---|
| 1 | $v_1 \sim v_8$ | 4+9+8+1+1+3+5+5 = 36 | 21 |
| 2 | $v_9$ | 21 | 47 |
| 3 | $v_4 \sim v_6$ | 1+1+3 = 5 | 0 |

COORDINATE INPUT APPARATUS

BACKGROUND OF THE INVENTION

1. Field of the Invention

The present invention relates to a coordinate input apparatus for inputting the coordinate value of a position on a display screen of a display unit disposed in a computer system or the like.

2. Description of the Prior Art

A display unit is disposed in a computer system for effecting data input/output operations. A cursor or an indication symbol (to be collectively called as a cursor herebelow) is used as a mark to indicate a processing objective position on a display screen of the display unit. Various kinds of coordinate input apparatuses are used to move the cursor to an arbitrary coordinate position in the display screen. Among such apparatuses, those called, for example, a mouse, a joystick, a track ball are generally capable of moving the cursor in an arbitrary direction on the display screen through a move operation in an operation section and are quite efficient in practice because the operation thereof is easy.

In general, a mouse is an apparatus having three bearings disposed on the bottom thereof and is operated by use of these bearings which roll on a desk, thereby obtaining a coordinate value from a rotation angle of the bearings. A joystick is generally an apparatus having a control bar, which is grasped and is inclined by the operator to an arbitrary position toward a front, rear, right, or left direction, thereby obtaining a coordinate value. In addition, a track ball includes a ball rotatable in any direction, which is rotated by a palm, a finger tip, or the like, thereby obtaining a coordinate value from a rotation angle of the ball. When a move operation is conducted, these apparatuses each simultaneously output a signal indicating an amount of movement in the X axis and a signal indicating an amount of movement in the Y axis, which determine the direction and amount of the movement of the cursor. The computer receives as inputs these movement signals in the respective axes and then controls the movement of the cursor on the display screen according to the received signals. For the control of cursor movement, the ratio of the amount of cursor movement to the amount of movement in the operation section is beforehand determined, and thus the cursor movement is controlled in proportion to the amount of movement in the operation section according to the ratio.

As the reference for the above-mentioned techniques, there have been the Japanese Patent Application Laid-Open Nos. 58-149535, 58-129643, 59-111524, and 59-22126, Japanese Utility Model Registration Application laid-open Nos. 57-29941, 59-6240, and 58-90433.

A coordinate position on a display screen is specified in various cases such as where a relatively fine position is specified, namely, a fine adjustment is effected and where a relatively long distance from an end of the display screen to a position, for example, an opposing end thereof is specified, namely, a coarse adjustment is achieved. That is, in a case of the fine adjustment, the amount of cursor movement is required to be made smaller as compared with the amount of movement in the operation section of the coordinate input apparatus, whereas in the coarse adjustment, the amount of cursor movement is required to be made greater as compared with the movement in the operation section. These requirements are mutually contradictory and therefore cannot be satisfied in the conventional system in which the ratio of the cursor movement to the movement in the operation section is fixed. The ratio of the cursor movement can be changed by a setting operation in a program or the like, and there are some systems having a special apparatus such as a switch, so that the ratio of the cursor movement is changed through an operation of the switch. However, this requires a particular operation, and it is quite troublesome for the operator to conduct this kind of operation during the coordinate specifying job.

SUMMARY OF THE INVENTION

It is therefore an object of the present invention to provide a coordinate input apparatus having an efficient operability.

Another object of the present invention is to provide a coordinate input apparatus having an effective operability which matches with the operational sense of the operator.

Still another object of the invention is to provide a coordinate input apparatus having an efficient operability with respect to the coarse and fine movements of the cursor.

Further another object of the present invention is to provide a coordinate input apparatus for preventing an undesired movement of the cursor which may be caused by a slight movement of the operation section due to an unexpected vibration or the like imparted from the operator.

These objects can be accomplished by a system including movement amount detecting means for detecting an amount of movement in the operation section, cursor movement ratio determining means for determining an amount of cursor movement on the display screen with respect to a unit of the movement amount in the operation section according to the amount of movement per unit time detected by the movement amount detecting means, and display means for moving and displaying the cursor according to the amount of movement in the operation section based on the ratio of cursor movement thus determined.

When handling an object, we naturally behave to move the object to a distant location at a higher speed, while the object is slowly moved for a fine positional adjustment. For the coordinate input, consequently, in a case where the cursor is moved to a relatively distant place, for example, from an end to an opposing end of the display screen, the operation section is subjected to a relatively rapid move operation. This causes the amount of movement per unit time to be increased in the operation section and hence the movement ratio calculating means outputs a movement ratio having a relatively large value. According to the movement ratio, the cursor movement ratio determining means determines a large value for the cursor movement ratio. Accordingly, the display means moves and displays the cursor at a higher speed.

Contrarily, in a case where a fine coordinate position is specified, the operation section is subjected to a move operation at a slow speed. In this case, therefore, the amount of movement per unit time is reduced in the operation section, and the movement ratio calculating means outputs a movement ratio having a small value. The movement determining means accordingly determines the cursor movement ratio to be a small value.

Based on the determined ratio, the display means moves and displays the cursor at a lower speed.

That is, for a higher-speed operation in the operation section, the cursor can be accordingly moved at a higher speed; whereas, for a lower-speed operation in the operation section, the cursor can be moved at a lower speed associated therewith. Namely, this provision enables to implement a coordinate input apparatus having an effective operability which matches with the operational sense of the operator.

BRIEF DESCRIPTION OF THE DRAWINGS

The present invention will be apparent from the following detailed description taken in conjunction with the accompanying drawings in which:

FIG. 1 is an explanatory diagram illustrating the movement in the operation section and the associated movement of the cursor according to an embodiment of the present invention;

FIGS. 13-15 are explanatory diagrams for concretely explaining the embodiment.

DESCRIPTION OF THE PREFERRED EMBODIMENTS

A description will be given of an embodiment of the present invention with reference to the drawings. In this embodiment, the above-mentioned mouse is used as the operation section of the coordinate input apparatus.

Figure 2:
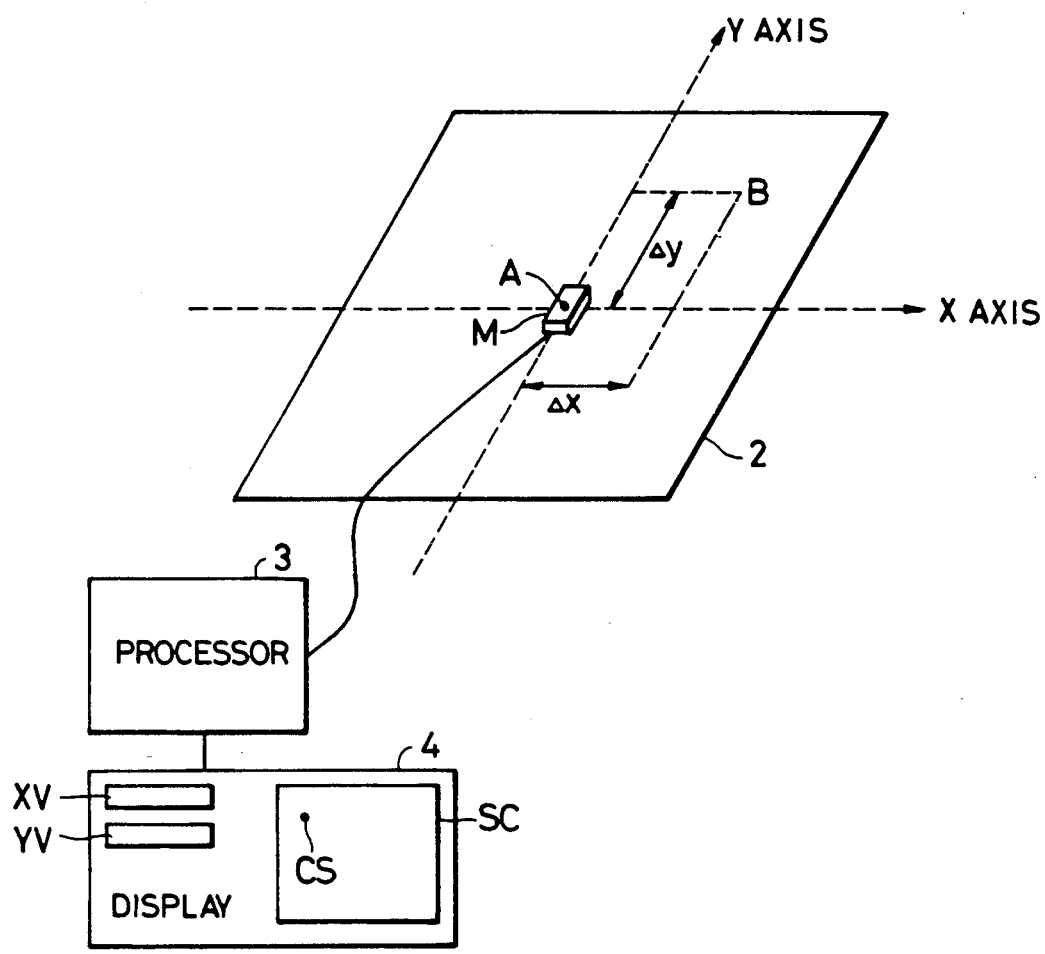
FIG. 2 is a schematic block diagram showing an example of a coordinate input apparatus.
Figure 3:
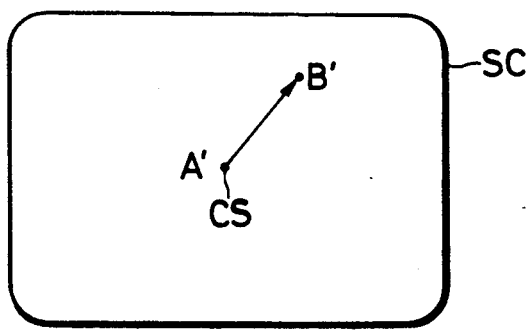
FIG. 3 is a front view of a display screen illustrating an example of the cursor movement on the display screen.

FIGS. 2-3 are diagrams for explaining the outline of the mouse. In these diagrams, the system includes a mouse M, a flat plate 2 such as a mat or a desk surface, a processing unit 3 such as a personal computer, and a display unit 4. When the body of the mouse M, namely, the operation section is moved on the mat 2, the coordinate position of the cursor CS displayed on the screen SC of the display unit 4 is determined. Assume here that the cursor CS points to a point A' on the screen SC of the display unit 4 in FIG. 3 and that the mouse M is correspondingly located at a point A on the mat 2. When the mouse M is moved to a point B on the mat 2, the mouse detects the movement amount $\Delta X$ in the X-axis direction and the movement amount $\Delta Y$ in the Y-axis direction and then sends the information thereabout to the processor 3. Based on the information, the processor 3 calculates the coordinate values of the cursor CS and stores the resultant data in the X coordinate storage area XV and the Y coordinate storage area YV of the display unit 4. Based on the contents of these storage areas XV and YV, the display unit 4 moves the cursor CS to a point B' on the screen SC and finally displays the cursor CS at the point B'.

Figure 4:
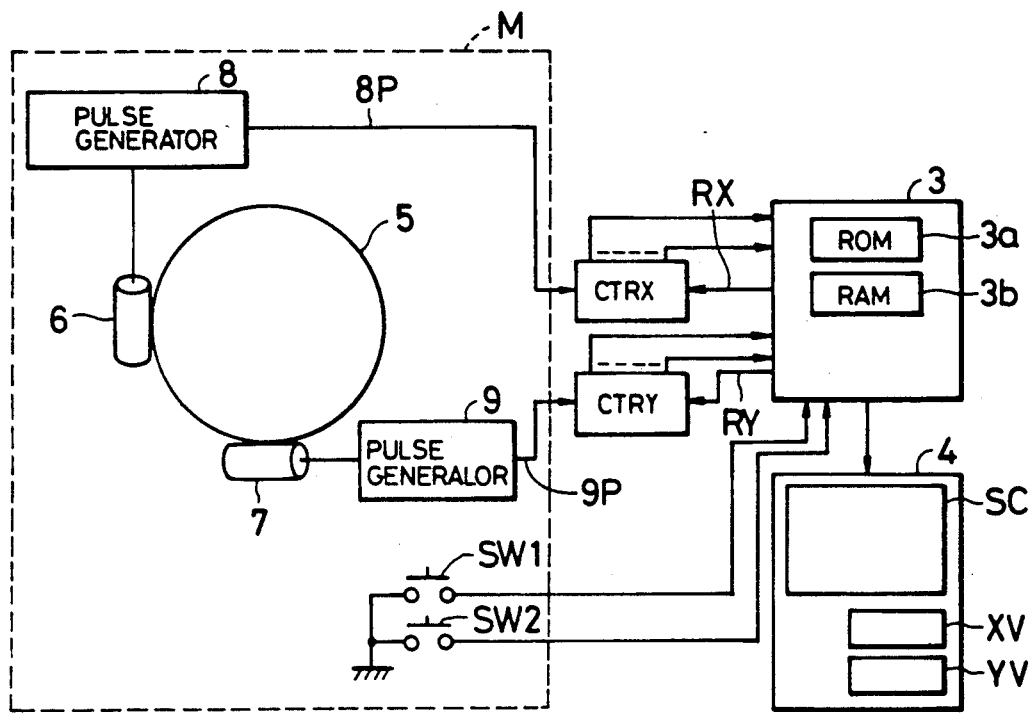
FIG. 4 is a block diagram illustrating an embodiment of the present invention.
Figure 5:
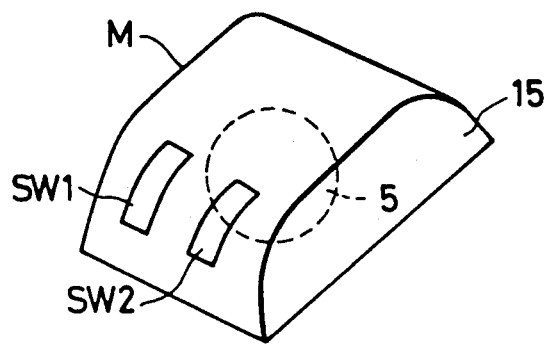
FIG. 5 is a perspective view illustrating an example of a mouse as an operation section.

A description will be given of FIGS. 4 and 5 in the following paragraphs. Reference symbol M indicates a mouse, which includes a case 15 and a ball 5 rotatably retained by the case 15 as shown in FIG. 5. In the case 15, there are disposed a roller 6 being in contact with the ball 5 for detecting the X-axis direction to be rotated by the rotation of the ball 5 and a roller 7 for detecting the Y-axis direction which is disposed perpendicular to the roller 6 and which has a similar configuration as compared therewith. The reference numeral 8 indicates a pulse generator linked to the roller 6 and generates a pulse signal 8P as the roller 6 rotates. Reference numeral 9 indicates a pulse generator linked to the roller 7 and generates a pulse signal 9P as the roller 7 rotates. CTRX indicates an X-axis counter for measuring the amount of movement in the X-axis direction, whereas CTRY is a Y-axis counter for measuring the amount of movement in the Y-axis direction. These counters CTRX and CTRY each are so configured to deliver a count value in a form of 10-bit binary data to the processor 3. Moreover, the counters CTRX and CTRY each are constructed such that the count values for the x and y coordinates can be reset, namely, cleared to zero by the reset instruction signals RX and RY, respectively from the processor 3.

In the configuration described above, when the mouse M is moved, the ball 5 rotates according to the movement and hence the rollers 6-7 being respectively in contact therewith along the X and Y axes rotate. The rotations are transferred to the pulse generators 8-9, respectively, which in turn generate pulses 8P and 9P, respectively corresponding to the amount of the rotation or the movement. These pulses 8P-9P are respectively inputted to the corresponding pulse counters CTRX and CTRY. Consequently, the amount of movement of the mouse M can be detected by referencing the count values of the counters CTRX and CTRY.

In order to enable the count values of the counters CTRX and CTRY to be referenced by the processor 3 configured with a microcomputer or the like and to enable the count values to be controlled by the processor 3, the counters CTRX and CTRY are connected to the processor 3. The mouse M is ordinarily provided with a plurality of key switches SW1 and SW2 to supply various instructions with respect to the current position of the cursor CS. In the case of the embodiment, the mouse M has two key switches. To enable the ON/OFF of these switches SW1 and SW2 to be confirmed by the processor 3, the signals therefrom are also delivered to the processor 3. The processor 3 has therein a read only memory (ROM) 3a and a random access memory (RAM) 3b, which are used to store predetermined program, data, and the like. The processor 3 executes the program to implement the predetermined processing. As described above, the display 4 includes a display screen SC, an X-axis coordinate storage area XV, and a Y-axis coordinate storage area YV.

FIG. 1 is a schematic diagram showing the outline of the operation of the embodiment. The cursor CS is assumed to be displayed on the display screen SC. In this diagram, the mouse M located in the bottom is moved in three different ways as indicated by S1, S2, and S3, where although the mouse M is moved by the same distance L, the moving speed is respectively changed. The various widths of the arrow marks A1, A2, and A3 in FIG. 1 indicate the associated moving speeds. That is, the speed is increased as the width becomes greater, namely, the moving speed is increased. In addition, the movement types S1, S2, and S3 of the mouse M respectively correspond to the movement of S1', S2', and S3' of the cursor CS on the display screen SC. In other words, when the mouse is very slowly moved by the distance L in the movement type as indicated by S1, the cursor CS does not move on the display screen as shown by the cursor movement S1'. This is effective in the following case, that is, where the mouse M located on a mat, a desk surface, or the like is slightly moved because the mat or the desk is vibrated due to some causes or because the mat or the desk is slightly inclined. In this situation, the movement of the mouse is unexpected for the operator, and for such a small change of position with respect to time, the mouse M is internally assumed not to have moved, which hence prevents an unstable vibration of the position of the cursor CS on the display screen SC.

When the mouse M is moved a bit faster as shown in the movement type S2, the cursor CS slightly moves as shown in the movement S2' on the display screen SC. Namely, this corresponds to the above-mentioned fine adjustment. Moreover, when the mouse is moved at a very high speed as shown in the movement type S3, the cursor CS greatly moves on the display screen SC as indicated by the movement type S3'. Namely, this corresponds to the coarse adjustment described above.

That is, according to the embodiment to be described in detail in the following paragraphs, even if the amount of movement of the mouse M is the same, the movement ratio of the cursor is automatically changed according to the moving speed, and therefore the moving speed of the cursor is changed.

Incidentally, the display 4 of the embodiment utilizes the dot matrix display system, for example, the display screen SC is constituted from 640 horizontal dots by 400 vertical dots.

Figure 6:
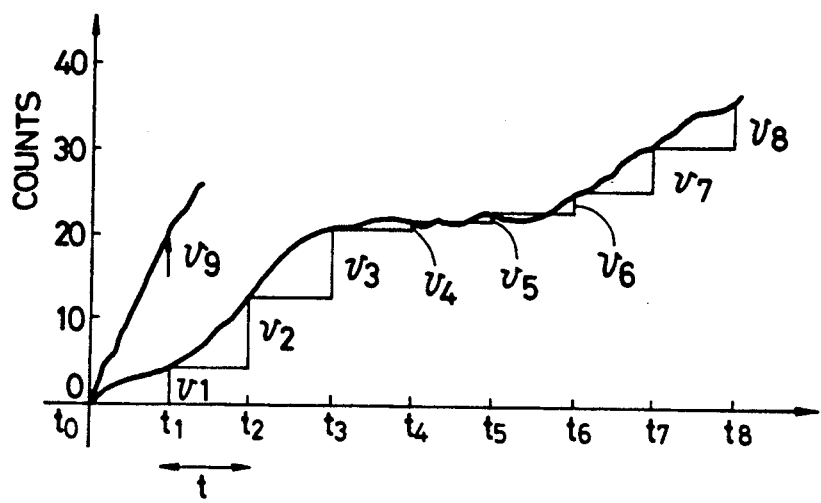
FIG. 6 is a graph showing the change with respect to time of the position associated with the movement in the operation section.
Figure 7:
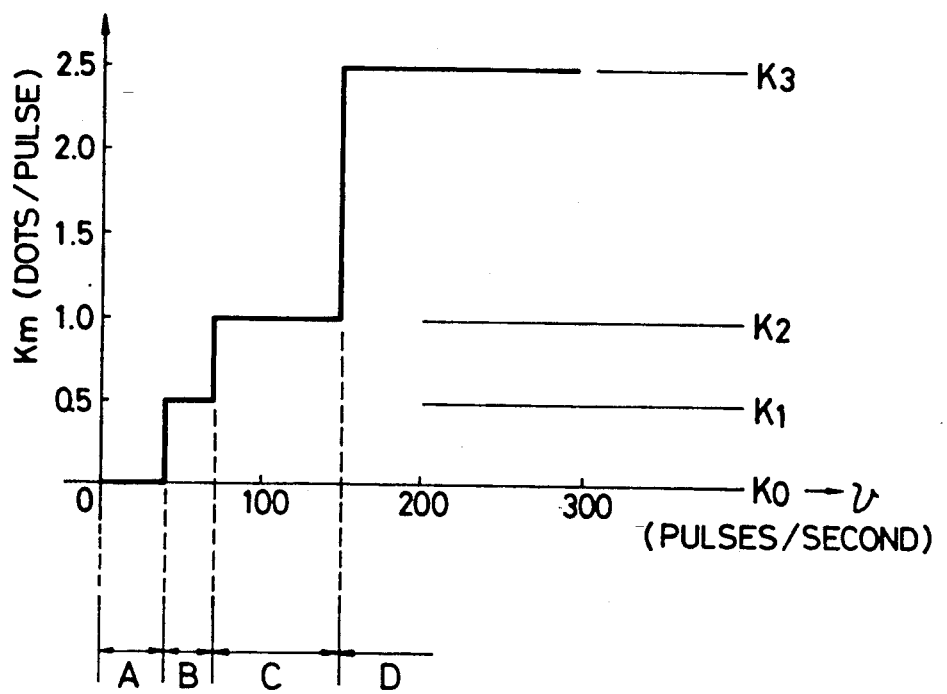
FIG. 7 is a graph showing an example of setting of the cursor movement ratio in the embodiment.

FIG. 6 shows an example of the change of position with respect to time when the mouse M is actually moved by hand. Here, the position is represented with the count values obtained by measuring the pulses from the mouse M in the counters CTRX and CTRY. Reference symbols $V_1$–$V_9$ each indicate the ratio of change of position at a 0.1-second interval, namely, the speed. The moving speed K (pulses/s) of the mouse M is here obtained by multiplying this value by ten. The areas A, B, C, and D are beforehand classified according to the magnitude of the value K as shown in FIG. 7, and the cursor movement ratio Km (dots/pulse) for converting the number of pulses into the number of dots of the display 4 is determined in advance for each area of A, B, C, and D.

Figure 8:
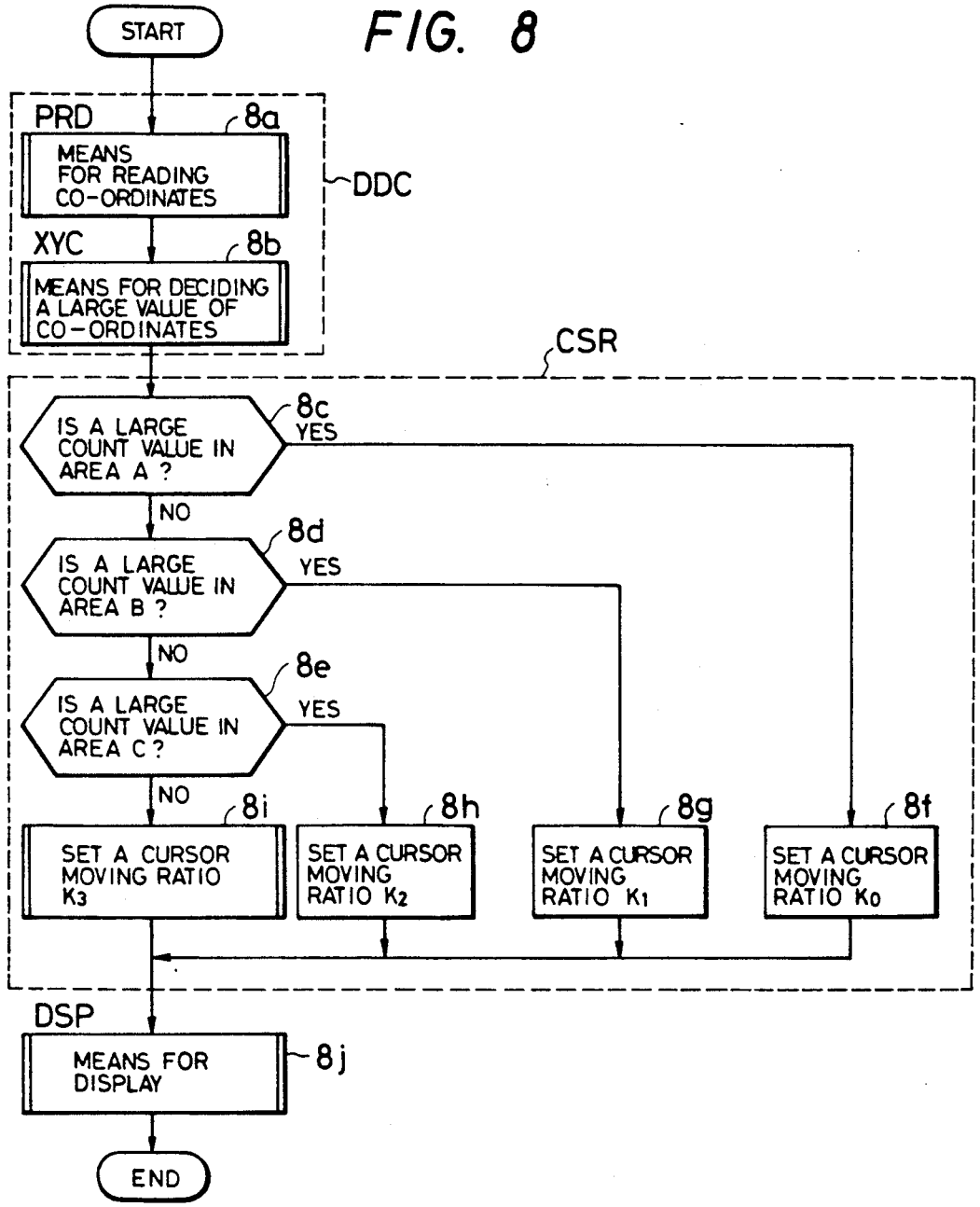
FIG. 8 is a flowchart illustrating the operation of the main processing routine.
Figure 9:
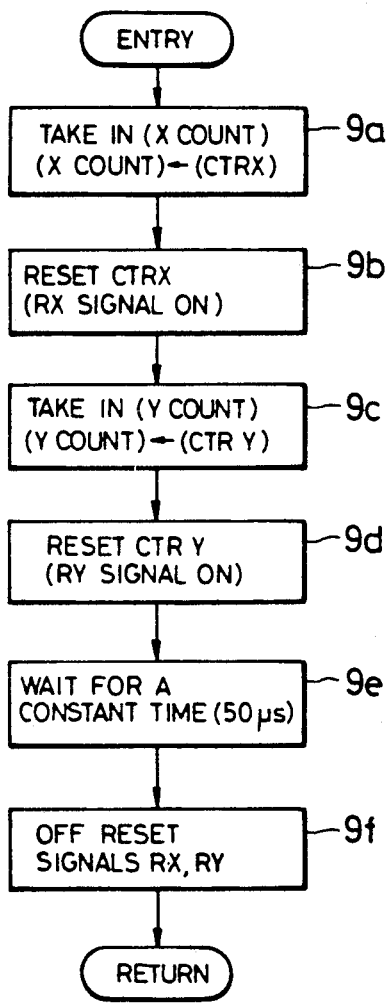
FIG. 9 is a flowchart showing an example of coordinate read means to be referenced in FIG. 8.
Figure 10:
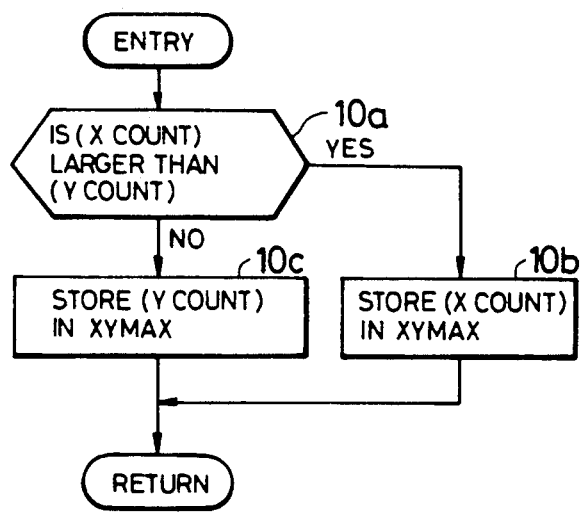
FIG. 10 is a flowchart showing an example of means for judging the magnitude of coordinate value to be referenced in FIG. 8.
Figure 11:
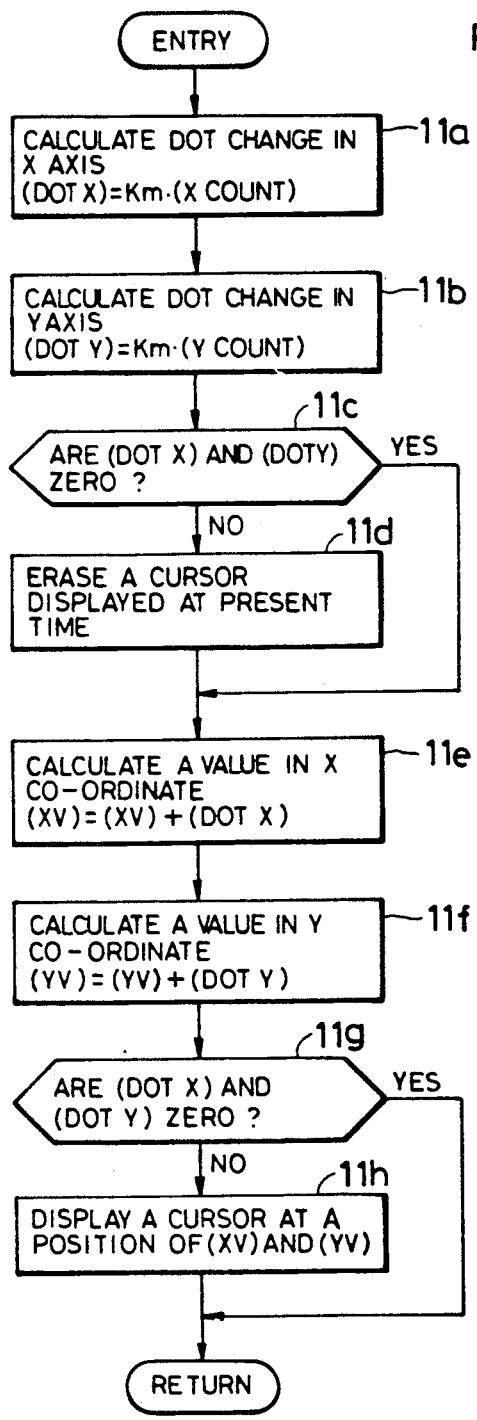
FIG. 11 is a flowchart showing an example of display means to be referenced in FIG. 8.

FIGS. 8–11 are flowcharts illustrating various processing means in which FIG. 8 is a flowchart of a main routine and FIGS. 9–11 are flowcharts of subroutines called in the main routine. These means represented in the flowcharts are stored in a form of program in the ROM 3a or RAM 3b of the processor 3. When the processor executes the programs, the predetermined function means are implemented.

Figure 12:
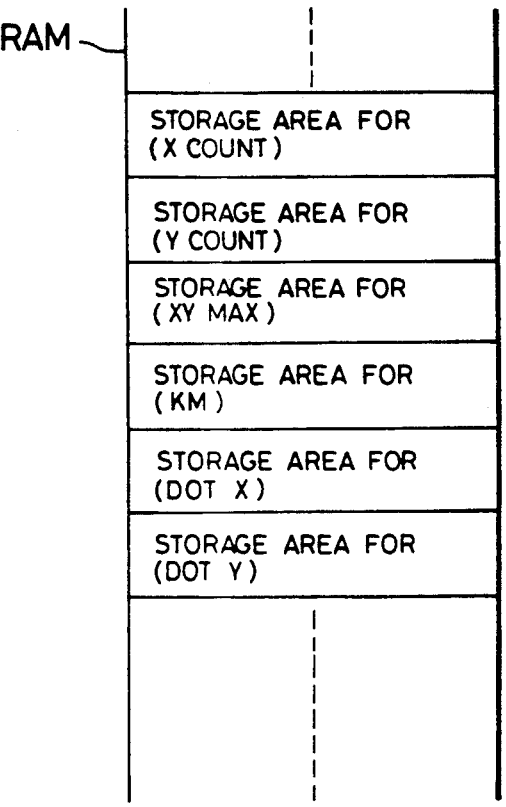
FIG. 12 is a schematic diagram illustrating various kinds of storage areas.

FIG. 12 shows a temporary storage and the like necessary to execute the respective processing. These areas are beforehand set at the predetermined addresses in the RAM 3b at the initialization of the program executing the pertinent processing. In this diagram, the storage includes a storage area XCOUNT for storing the count value of the X-axis counter CTRX, a storage area YCOUNT for storing the count value of Y-axis counter CTRY, and a storage area XYMAX for storing the larger one of the count values stored in the storage areas XCOUNT and YCOUNT. Although depending on the moving direction, when the mouse M is moved in a direction slightly inclined with respect to the X-Y plane, the X and Y axes are both moved. This embodiment is so configured to reflect the movement ratio of one of these axes that is subjected onto the greater movement to the other axis. The storage area XYMAX is disposed for this purpose. A storage area KM is used to store the cursor movement ratio which determines the number of dots to move the cursor CS on the display screen SC for each unit movement amount of the mouse M. In this embodiment, this ratio is determined and is stored according to FIG. 7. Storage areas DOTX and DOTY are disposed to store the number of dots for the cursor movement on the display surface SC calculated from the count values stored in the storage areas XCOUNT and YCOUNT according to the cursor movement ratio Km.

The routine of FIG. 8 is initiated in a series of processes of the processor, for example, by a periodic timer interruption, or the like, namely, at an interval of about 10 ms, in general. When the processing is finished, control returns to the processes that has been interrupted. When this outline is initiated, step 8a is executed, and an execution of step 8b follows. The step 8a includes coordinate read means PRC, wherзas the step 8b comprises means for deciding the larger coordinate value XYC. These means PRC and XYC constitute means for calculating the movement ratio DDC. FIG. 9 shows the detailed configuration of the coordinate read means PRD of the step 8a. When the coordinate read means PRD is initiated, step 9a reads the amount of movement of the mouse M in the X-axis direction, namely, the count value of the X-axis counter CTRX and stores the obtained value in the storage area XCOUNT. In the subsequent step 9b, a reset instruction signal RX is outputted to reset the content of the X-axis counter CTRX. Step 9c reads the amount of movement of the cursor M in the Y-axis direction, namely, the count value of the Y-axis counter CTRY and stores this value in the storage area YCOUNT. In the following step 9d, a reset instruction signal RY is outputted to reset the content of the Y-axis counter CTRY. In step 9e, the reset instruction signals RX and RY are kept outputted for a preset period of time, for example, 50 μs, and then the output of these signals RX and RY are terminated in step 9f. As described above, the coordinate read means PRD is executed at a preset interval of time by use of an interruption or the like. In this embodiment, the interval of time is 10 ms. The contents of the X-axis and Y-axis counters CTRX and CTRY are read and cleared at this interval. Consequently, the storage areas XCOUNT and YCOUNT are sequentially provided with the amount of movement of the mouse M during the 10 ms, namely, the count values of the counters CRTX and CRTY, respectively. In other words, these values represent the movement ratio of the mouse M. FIG. 10 shows a detailed flowchart of the means for deciding the larger coordinate value XYC indicated by the step 8b of FIG. 10. When initiated, the coordinate value decide means XYC first compares in step 10a the content of the storage area XCOUNT with the content of the storage area YCOUNT and then judges the compare result to decide the larger coordinate value. If the content of the storage area XCOUNT is larger, step 10b stores the content of the storage area XCOUNT in the storage area XYMAX. Contrarily, if the content of the storage area YCOUNT is smaller than the content of the storage area XCOUNT, step 10c stores the content of the storage area YCOUNT in the storage area XYMAX. As a result, the larger one of the change ratios with respect to the X and Y axes is stored in the storage area XYMAX.

After the processing of the steps 8a and 8b is finished, the step 8c and the subsequent steps are achieved. Steps 8c, 8d, 8e, ..., 8i constitute the means for deciding the ratio of the cursor movement CSR. That is, the ratio decide means CSR decides the number of dots by which the cursor CS is moved on the display screen SC for each unit movement amount of the mouse M. In the case of this embodiment, the program is beforehand so programed to determine this value based on FIG. 7. Namely, the steps 8c, 8d, and 8e check the value of the storage area XYMAX to determine one of the areas A, B, C and D of FIG. 7 in which the value of XYMAX is to be located. If the result indicates the area A, the step 8f stores the cursor movement ratio $K_0$, namely, 0 [dots/pulse] in the storage area KM, if the area B is indicated, the step 8g stores the cursor movement ratio $K_1$, namely, 0.5 [dots/pulse] in the storage area KM, if the result indicates the area C, the step 8h stores the cursor movement ratio $K_2$, namely, 1 [dot/pulse] in the storage area KM, and if the area D is indicated, the step 8i stores the cursor movement ratio $K_3$, namely, 2.5 [dots/pulse] in the storage area KM.

The subsequent step 8j executes the display means DSP, which controls the movement of the cursor CS on the display screen SC based on the ratio of cursor movement Km decided by the cursor movement ratio decide means CSR. FIG. 11 is a flowchart illustrating in detail the display means DSP in which the first step 11 executes a calculate processing of the change in terms of dots with respect to the X axis and then step 11b achieves a calculate processing of the change in terms of dots with respect to the Y axis. Namely, the cursor movement ratio Km decided by the cursor movement ratio decide means CSR is multiplied by the corresponding values of the storage areas XCOUNT and YCOUNT, and the results are respectively stored in the storage areas DOTX and DOTY. In step 11c, it is checked whether or not the mouse has not been moved, namely, whether or not the values of the storage areas DOTX and DOTY both are not zero. If the values are not zero at the same time, step 11d execute an erase processing of the cursor currently displayed on the display screen SC, and control is passed to step 11e. If the values are zero at the same time, control is directly passed to the step 11e without executing the step 11d. In the step 11e, the X coordinate on the display screen SC is calculated for the movement of the mouse M, and then step 11f calculates the corresponding X coordinate. Namely, the values calculated in the steps 11a and 11b and then stored in the storage areas DOTX and DOTY, respectively are subjected to an integration and are stored in the X-axis and Y-axis coordinate storage areas XV and YV, respectively. Like the step 11c, the step 11g checks the contents of the storage areas DOTX and DOTY. If any change thereof is detected, the cursor CS is displayed on the display screen SC at a coordinate position depending on the coordinate values stored in the X-axis and Y-axis coordinate storage areas XV and YV in the step 11h, and thereafter control returns to the main routine. In the step 11g, if the contents of the storage areas DOTX and DOTY are both zero, control is passed to the main routine without executing the step 11h.

Next, by referring to the data of FIGS. 6–7, the embodiment will be described with concrete values. In FIG. 7, the speed regions are beforehand set as follows. That is:

$$40 \text{ [pulses/s]} \geq \text{Region A} \quad (1)$$

$$40 \text{ [pulses/s]} < \text{Region B} \leq 70 \text{[pulses/s]} \quad (2)$$

$$70 \text{ [pulses/s]} < \text{Region C} \leq 150 \text{[pulses/s]} \quad (3)$$

$$150 \text{ [pulses/s]} < \text{Region D} \quad (4)$$

FIG. 3 is a table illustrating the amount of movement and the moving speed for each interval of 0.1 second in which the movement of the mouse M is measured. The table further includes the regions of FIG. 7 classified by the speed, the incrementation of dots obtained by multiplying the movement ratio by the cursor movement ratio Km determined according to the region, and the integration value thereof.

Figure 15:
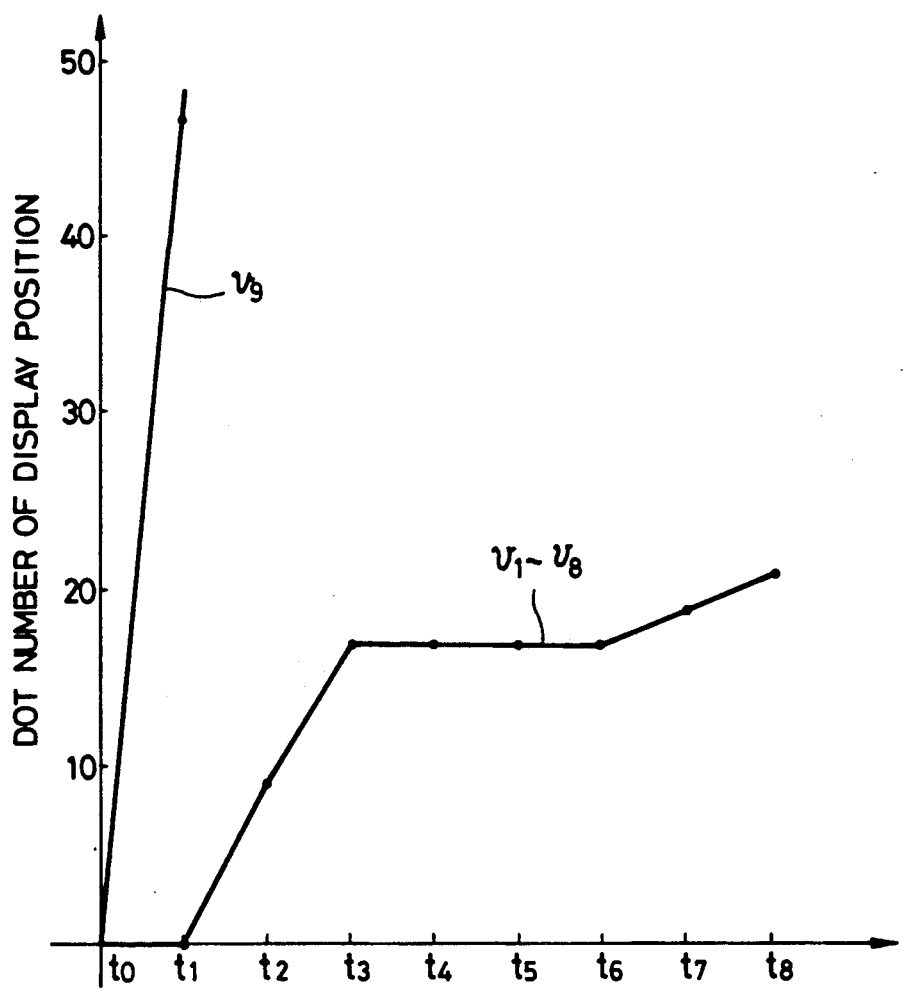

For example, in the interval $v_1$, since the change takes from 0 pulse to 4 pulses as shown in FIG. 6, the amount of movement is 4, the speed is 40 [counts/s], the incrementation of dots is 0 dot because the speed belongs to the region A and the cursor movement ratio Km is 0, and the integration value is therefore 0. In other words, even when the mouse M is subjected to a movement of four pulses, the cursor CS does not move on the screen SC. Subsequently, when the mouse M is moved from $v_1$ to $v_8$, namely, by 36 counts, the cursor CS moves a distance of 21 dots on the screen SC. FIG. 15 is a graph showing the movement. This diagram corresponds to FIG. 6. FIG. 14 is a table listing the amount of movement of the mouse M and the amount of movement of the cursor CS in the typical three intervals selected from FIG. 13, namely, $v_1$ to $v_8$, $v_9$, and $v_4$ to $v_6$. Example 1 is case where the mouse is moved at an ordinary speed. For a movement of 36 counts made by the mouse M, the cursor CS slowly moves a distance of 21 dots at a speed suitable for the fine positional adjustment. In the case of example 2 where the mouse M is rapidly moved, the cursor swiftly moves a distance of 47 dots at a speed suitable for a large movement of the cursor CS. Example 3 is a case where the mouse M is quite slowly moved in which for a 5-count movement of the mouse M, the cursor CS does not move; consequently, this prevents an unexpected movement when the mouse M falls at a low speed or is subjected to a vibration.

As described above, when the routine of FIG. 8 is repetitiously executed at 10-ms intervals in this embodiment, the ratio of the cursor movement, namely, the cursor movement ratio Km is automatically changed according to the movement of the mouse M and the moving speed thereof so as to control the movement of the cursor CS on the display screen. Consequently, when the moving speed of the mouse M is very small, the movement ratio Km is set to 0, thereby preventing an unstable movement of the cursor CS for a slide or a vibration of the mouse M. When the moving speed of the mouse M is relatively slow, the movement ratio Km is set to a smaller value to slowly and smoothly move the cursor CS, which enables a relatively fine adjustment of the cursor position. Moreover, when the moving speed of the mouse M is quite large, the movement ratio Km is set to a large value, which causes the cursor CS to move a long distance, namely, a long-distance movement of the cursor CS can be effectively accomplished. These operations each are changed over depending on the moving speed of the mouse M. For example, when the operator slowly moves the mouse for a fine adjustment, the moving speed of the cursor CS is automatically reduced. When the mouse M is rapidly moved for a cursor movement of a long distance, the moving speed of the cursor CS is automatically increased and hence the operation can be achieved with requirements of the human technology being further satisfied.

Although the embodiment has been described in which the mouse is used as an operation device for indicating the amount of the cursor movement, a track ball, a joystick, or the like may also be applied in place of the mouse M; namely, any device having the similar function can be adopted. In addition, although the embodiment has been described with four kinds of cursor movement ratios Km, the number of cursor movement ratios may be less than or greater than four, namely, only a plurality of cursor movement ratios need be used.

Furthermore, although the embodiment has been described in which the cursor movement ratio Km is decided such that one of the cursor movement ratios associated with the X and Y axes is reflected onto the other cursor movement ratio, these ratios may be independently decided so that the cursor movement is controlled with the different cursor movement ratios Km for the respective axes based on the decided results.

I claim:

1. A method of moving and displaying a cursor on a display screen in response to physical movement of an operation section comprising the steps of:
    detecting an amount of physical movement of the operation section during a predetermined period of time;
    calculating an amount of physical movement per unit time of the operation section from the detected amount of physical movement of the operation section and said predetermined period of time;
    deciding a ratio of an amount of movement of the cursor on the screen to a predetermined amount of physical movement of the operation section according to the calculated amount of physical movement of the operation section per unit time; and
    moving and displaying the cursor on the display screen corresponding to the amount of physical movement of the operation section on the basis of the decided ratio of the movement of the cursor.

2. A method according to claim 1, wherein said amount of physical movement of the operation section per predetermined period of time is calculated on the basis of an amount of physical movement of the operation section sequentially detected at a predetermined interval of time.

3. A method according to claim 1, wherein said ratio is decided to be zero when the calculated amount of physical movement of the operation section per predetermined period of time is equal to or less than a predetermined value.

4. A method according to claim 1, wherein:
    an amount of physical movement of the operation section in each of an X-axis and Y-axis directions is detected;
    the amount of physical movement of the operation section per predetermined period of time is calculated from the detected amount of physical movement of the operation section in one of said directions; and
    the cursor is moved and displayed on the display screen corresponding to the amount of physical movement of the operation section in each of said directions on the basis of the decided ratio of the movement of the cursor.

5. A method according to claim 1, wherein:
    an amount of physical movement of the operation section in each of an X-axis and Y-axis directions is detected;
    the amount of physical movement of the operation section per predetermined period of time in said each of directions is calculated from the detected amount of physical movement of the operation section in said each of directions;
    the ratio of the amount of movement of the cursor on the screen along each of axes corresponding to said directions to the predetermined amount of physical movement of the operation section in said each of directions is decided according to the calculated amount of movement of the operation section per predetermined period of time in said each of directions; and
    the cursor is moved and displayed on the display screen corresponding to the amount of physical movement of the operation section in said each of directions on the basis of the decided ratio of the movement of the cursor along said each of axes corresponding to said directions.

6. A method of moving and displaying a cursor on a display screen in response to physical movement of an operation section comprising the steps of:
    detecting an amount of physical movement of the operation section during a predetermined period of time;
    calculating a moving speed of the operation section from the detected amount of physical movement of the operation section and said predetermined period of time;
    deciding a ratio of an amount of movement of the cursor on the screen to a predetermined amount of physical movement of the operation section according to the calculated moving speed of the operation section; and
    moving and displaying the cursor on the display screen corresponding to the amount of physical movement of the operation section on the basis of the decided ratio of the movement of the cursor.

7. A method according to claim 6, wherein said moving speed of the operation section is calculated on the basis of an amount of physical movement of the operation section sequentially detected at a predetermined interval of time.

8. A method according to claim 6, wherein said ratio is decided to be zero when the calculated moving speed of the operation section is equal to or less than a predetermined value.

9. A method according to claim 6, wherein:

an amount of physical movement of the operation section in each of an X-axis and Y-axis directions is detected;

the moving speed of the operation section is calculated from the detected amount of physical movement of the operation section in one of said directions; and the cursor is moved and displayed on the display screen corresponding to the amount of physical movement of the operation section in each of said directions on the basis of the decided ratio of the movement of the cursor.

10. A method according to claim 6, wherein:

an amount of physical movement of the operation section in each of an X-axis and Y-axis directions is detected;

the moving speed of the operation section in said each of directions is calculated form the detected amount of physical movement of the operation section in said each of directions;

the ratio of the amount of movement of the cursor on the screen along each of axes corresponding to said directions to the predetermined amount of physical movement of the operation section in said each of directions is decided according to the calculated moving speed of the operation section in said each of directions; and the cursor is moved and displayed on the display screen corresponding to the amount of physical movement of the operation section in said each of directions on the basis of the decided ratio of the movement of the cursor along said each of axes corresponding to said directions.

11. A method of moving and displaying a cursor on a display screen in response to physical movement of an operation section comprising the steps of:

detection an amount of physical movement of the operation section during a predetermined period of time;

calculating an amount of physical movement per unit time of the operation section from the detected amount of physical movement of the operation section and said predetermined period of time;

deciding a ratio of an amount of movement of the cursor on the screen to a predetermined amount of physical movement of the operation section according to the calculated amount of physical movement of the operation section per unit time;

storing the decided ratio of the movement of the cursor in storage means; and moving and displaying the cursor on the display screen corresponding to the amount of physical movement of the operation section on the basis of the ratio of the movement of the cursor stored in the storage means.

12. A method according to claim 11, wherein said amount of physical movement of the operation section per predetermined period of time is calculated on the basis of an amount of physical movement of the operation section sequentially detected at a predetermined interval of time.

13. A method according to claim 11, wherein said ratio is decided to be zero when the calculated amount of physical movement of the operation section per predetermined period of time is equal to or less than a predetermined value.

14. A method of moving and displaying a cursor on a display screen in response to physical movement of an operation section comprising the steps of:

detecting an amount of physical movement of the operation section comprising the steps of:

detecting an amount of physical movement of the operation section during a predetermined period of time;

calculating an amount of physical movement per unit time of the operation section from the detected amount of physical movement of the operation section and said predetermined period of time;

selecting one of a plurality of predetermined ratios of an amount of movement of the cursor on the display screen to a predetermined amount of physical movement of the operation section according to the calculated amount of physical movement of the operation section per unit time, said ratios being different from each other; and moving and displaying the cursor on the display screen corresponding to the amount of physical movement of the operation section per unit time, said ratios being different from each other; and moving and displaying the cursor on the display screen corresponding to the amount of physical movement of the operation section on the basis of the selected ratios o the movement of the cursor.

15. A method according to claim 14, wherein said amount of physical movement of the operation section per predetermined period of time is calculated on the basis of an amount of physical movement of the operation section sequentially detected at a predetermined interval of time.

16. A method according to claim 14, wherein said plurality ratios include zero, and the ratio of zero is selected when the calculated amount of physical movement of the operation section per predetermined period of time is equal to or less than a predetermined value.

17. A method of moving and displaying a cursor on a display screen in response to physical movement of an operation section comprising the steps of:

detecting an amount of physical movement of the operation section during a predetermined period of time;

calculating a moving speed of the operation section from the detected amount of physical movement of the operation section and said predetermined period of time;

deciding a ratio of an amount of movement of the cursor on the screen to a predetermined amount of physical movement of the operation section according to the calculated moving speed of the operation section;

storing the decided ratio of the movement of the cursor in storage means; and moving and displaying the cursor on the display screen corresponding to the amount of physical movement of the operation section on the basis of the ratio of the movement of the cursor stored in the storage means.

18. A method according to claim 17, wherein said moving speed of the operation section is calculated on the basis of an amount of physical movement of the operation section sequentially detected at a predetermined interval of time.

19. A method according to claim 17, wherein said ratio is decided to be zero when the calculated moving speed of the operation section is equal to or less than a predetermined value.

20. A method of moving and displaying a cursor on a display screen in response to physical movement of an operation section comprising the steps of:
    detecting an amount of physical movement of the operation section during a predetermined period of time;
    calculating a moving speed of the operation section from the detected amount of physical movement of the operation section and said predetermined period of time;
    selecting one of a predetermined ratios of an amount of movement of the cursor on the display screen to a predetermined amount of physical movement of the operation section according to the calculated moving speed of the operation section, said ratios being different from each other; and
    moving and displaying the cursor on the display screen corresponding to the amount of physical movement of the operation section on the basis of the selected ratio of the movement of the cursor.

21. A method according to claim 20, wherein said moving speed of the operation section is calculated on the basis of an amount of physical movement of the operation section sequentially detected at a predetermined interval of time.

22. A method according to claim 20, wherein said plurality ratios include zero, and the ratio of zero is selected when the calculated moving speed of the operation section is equal to or less than a predetermined value.

23. A coordinate input apparatus responsive to physical movement of an operation section for moving and displaying a cursor displayed on a display screen comprising:
    movement amount detecting means for detecting an amount of physical movement of the operation section during a predetermined period of time;
    calculating means for calculating an amount of physical movement per time of the operation section from the amount of physical movement detected by said movement amount detecting means and said predetermined period of time;
    cursor movement ratio deciding means for deciding a ratio of an amount of movement of the cursor on the screen to a predetermined amount of physical movement of the operation section according to the amount of physical movement of the operation section per unit time calculated by said calculating means; and
    display means for moving and displaying the cursor on the display screen corresponding to the amount of physical movement of the operation section on the basis of the ratio decided by said cursor movement ratio deciding means.

24. A coordinate input apparatus according to claim 23, wherein said calculating means calculates the amount of physical movement of the operation section per predetermined period of time on the basis of the movement of physical movement of the operation section sequentially detected at a predetermined interval of time.

25. A coordinate input apparatus according to claim 23, wherein said cursor movement ratio deciding means sets the cursor movement ratio to 0 when a rate of movement is equal to or less than a predetermined value.

26. A coordinate input apparatus responsive to physical movement of an operation section for moving and displaying a cursor displayed on a display screen comprising:
    movement amount detecting means for detecting an amount of physical movement of the operation section during a predetermined period of time;
    calculating means for calculating a moving speed of the operation section from the amount of physical movement detected by said movement amount detecting means and said predetermined period of time;
    cursor movement ratio deciding means for deciding a ratio of an amount of movement of the cursor on the screen to a predetermined amount of physical movement of the operation section according to the moving speed of the operation section calculated by said calculating means; and
    display means for moving and displaying the cursor on the display screen corresponding to the amount of physical movement of the operation section on the basis of the ratio decided by said cursor movement ratio deciding means.

27. A coordinate input apparatus according to claim 26, wherein said calculating means calculates the moving speed of the operation section on the basis of the amount of physical movement of the operation section sequentially detected at a predetermined interval of time.

28. A coordinate input apparatus according to claim 26, wherein said cursor movement ratio deciding means sets the cursor movement ratio to 0 when a rate of movement is equal to or less than a predetermined value.

29. A coordinate input apparatus comprising:
    an operation section for indicating by a move operation during a predetermined period of time an amount of movement of a cursor on a display screen;
    movement rate calculating means for calculating a movement rate from an amount of movement of the operation section detected by detecting means and said predetermined period of time;
    cursor movement ratio deciding means for receiving as an input said movement rate calculated by said movement rate calculating means and for deciding a movement ratio of the cursor to a predetermined amount of movement of the operation section; and
    display means for moving and displaying the cursor corresponding to the amount of movement of the operation section based on the movement ratio of the cursor decided by said cursor movement ratio deciding means.

30. A coordinate input apparatus according to claim 29, wherein said cursor movement ratio deciding means sets the movement ratio of the cursor to 0 when the movement rate is equal to or less than a predetermined value.

31. A coordinate input apparatus according to claim 29, wherein:
    said operation section arbitrarily indicates a moving direction of the cursor and an amount of movement thereof on an XY display screen;
    said detecting means responsive to said operation section detects and outputs the amount of movement in an X-axis direction and the amount of movement in a Y-axis direction which determines a moving direction of the cursor;

said movement rate calculating means calculates an amount of movement per predetermined period of time with respect to one of the X-axis and Y-axis directions; and said display means moves and displays the cursor corresponding to the amount of movement of each axis-direction indicated by said operation section based on the ratio of the movement of the cursor decided by said cursor movement ratio deciding means.

32. A coordinate input apparatus according to claim 29, wherein said operation section arbitrarily indicates a moving direction of the cursor and an amount of movement thereof on an XY display screen;

said detecting means responsive to said operation section detects and outputs the amount of movement in an X-axis direction and the amount of movement in a Y-axis direction which determines a moving direction of the cursor;

said movement rate calculating means respectively calculates and outputs an amount of movement per predetermined period of time in each of said directions;

said cursor movement ratio deciding means receives as an input the movement rate for each axis calculated by said movement rate calculating means and decides a ratio of a movement of the cursor to a predetermined amount of movement of said operation section along each axis; and said display means moves and displays the cursor corresponding to the amount of movement in each axis direction of said operation section based on the ratio of movement of the cursor decided by said cursor movement ratio deciding means.

33. A coordinate input apparatus responsive to physical movement of an operation section for moving and displaying a cursor displayed on a display screen to a corresponding coordinate position on the display screen comprising:

movement amount detecting means for detecting an amount of movement of the operation section during a predetermined period of time;

cursor movement ratio deciding means for deciding a ratio of an amount of movement of the cursor on the display screen to a predetermined amount of physical movement per unit time of the operation of section according to an amount of movement of the operation section detected by said movement amount detecting means and said predetermined period of time;

cursor movement ratio storage means for storing a ratio of the movement of the cursor decided by said ratio deciding means; and display means for moving and displaying the cursor on the display screen corresponding to the amount of movement of the operation section based on the ratio of the movement of the cursor stored in said cursor movement ratio storage means.

34. A coordinate input apparatus responsive to a physical movement of an operation section for moving and displaying a cursor displayed on a display screen to a corresponding coordinate position on the display screen comprising:

movement amount detecting means for detecting an amount of movement of the operation section during a predetermined period of time;

cursor movement ration storage means for storing a plurality of predetermined ratios of an amount of movement of the cursor on the display screen to a predetermined amount of physical movement per unit time of the operation section, said ratios being different from each other;

cursor movement ratio selecting means for selecting one of said plurality of ratios of the movement of the cursor stored in said cursor movement ratio storage means according to an amount of movement of the operation section detected by said movement amount detecting means and said predetermined period of time; and display means for moving and displaying the cursor corresponding to the amount of movement of the operation section based on the selected ratio of the movement of the cursor.

* * * * *